United States Patent Office 3,450,638
Patented June 17, 1969

3,450,638
HYDROGEN GENERATING COMPOSITION
Lawrence J. Edwards, Edwards, Calif., assignor to Mine Safety Appliances Company, a corporation of Pennsylvania
No Drawing. Filed Jan. 3, 1966, Ser. No. 517,943
Int. Cl. C09k 3/02; C01b 1/05
U.S. Cl. 252—188          11 Claims

ABSTRACT OF THE DISCLOSURE

Solid compositions that decompose to produce hydrogen contain a material that exothermically decomposes to liberate hydrogen and a material that endothermically decomposes to liberate hydrogen.

---

This invention relates to the generation of hydrogen and more particularly to new chemical compositions that decompose to produce hydrogen.

Chemical sources of hydrogen gas are used for generation of hydrogen in the field for a variety of uses, such as welding and the inflation of buoyant devices. Heretofore, hydrogen has conventionally been generated by reacting hydrogen-containing materials, such as borohydrides or metal hydrides, with water. The amount of hydrogen produced per pound of reactants for these materials is comparatively low and water is not always available, especially in emergency military situations, so there is a need for a self-contained hydrogen generating material that yields a high proportion of hydrogen per unit weight.

A number of materials obtained from the reaction of boranes with hydrazine, ammonia, or lower alkylamines are known that have a high internal energy and, when decomposition is initiated as by local heating, exothermically decompose to liberate hydrogen. The decomposition is irreversible, evolves large amounts of thermal energy and is autogeneous, that is, the decomposition is self-generated or self-sustained once it is initiated. Such materials have been considered suitable as monopropellants in reaction engines. There are considerable practical difficulties in using such materials to generate hydrogen that can be collected and used because of the extremely rapid release of hydrogen and the high temperature of the hydrogen produced. In cases where the generated hydrogen is introduced into closed containers or manifolds, high initial pressures result from the high temperature of the gas, for a given quantity of hydrogen in a given system. When inflating balloons, the balloon material may be destroyed by the very hot hydrogen. Also, shock waves or pressure waves occur that frequently rupture or weaken the gas receivers.

It is an object of this invention to provide a self-contained chemical hydrogen source. Another object is to provide a chemical hydrogen source in which the rate of hydrogen generation and temperature can be adjusted and controlled. Another object is to provide a chemical hydrogen source containing a material that exothermically decomposes to liberate hydrogen and a material that endothermically decomposes to liberate hydrogen. Other objects will be apparent from the following description and claims.

The compositions of this invention comprise a mixture of a solid component containing boron, nitrogen and hydrogen that autogeneously exothermically decomposes to evolve hydrogen and a solid component that endothermically decomposes to evolve hydrogen. The components are intimately mixed so that the thermal energy released by the exothermic decomposition is utilized to decompose the component that endothermically decomposes. For convenience, these materials will hereinafter be referred to as the exothermic component and the endothermic component.

Exothermic components suitable for use in this invention include hydrazine-boranes such as, for example, hydrazine-bis-borane $(N_2H_4)(BH_3)_2$; hydrazino-bis-borane, $N_2H_2(BH_2)_2$ and hydrazine-mono-borane, $N_2H_4BH_3$; lower alkyl substituted hydrazine boranes such as, for example, dimethylhydrazine-bis-borane, $$N_2H_2(CH_3)_2(BH_3)_2$$

methylhydrazine-bis-borane, $N_2H_3CH_3(BH_3)_2$, and dimethylhydrazine-mono-borane, $N_2H_2(CH_3)_2BH_3$; ammonia borane, $NH_3BH_3$; lower primary and secondary amine boranes, such as, for example, methylamine borane, $CH_3NH_2BH_3$, and dimethylamine borane, $(CH_3)_2NH \cdot BH_3$; and compounds of hydrazine and higher boranes and lower alkyl substituted hydrazine-higher boranes, as disclosed in the co-pending application of Hough and Hefferan, Ser. No. 806,728, filed April 15, 1959, now Patent No. 3,298,799 of common ownership with this application, for example, hydrazine-tetraborane (10), $N_2H_4B_4H_{10}$; hydrazine pentaborane(9), $N_2H_4B_5H_9$; hydrazine decaborane(14), $N_2H_4B_{10}H_{14}$; trihydrazine decaborane (14), $(N_2H_4)_3(B_{10}H_{14})$; dimonomethylhydrazine pentaborane(9), $(CH_3N_2H_3)_2(B_5H_9)$; trimonomethylhydrazine pentaborane(9), $(CH_3N_2H_3)_3(B_5H_9)$; methylhydrazine decaborane(14), $(CH_3N_2H_3)(B_{10}H_{14})$; and di-methylhydrazine decaborane(14), $$(CH_3N_2H_3)_2B_{10}H_{14}$$

Preferably, the exothermic component contains one boron atom for each nitrogen atom and contains only boron, nitrogen and hydrogen. The only gaseous product from the decomposition of such materials is hydrogen, the other decomposition product being boron nitride. The lower alkyl substituted compounds give some gaseous organic products on decomposition and are suitable for uses in which such impurities can be tolerated, such as in inflating balloons. The preferred exothermic components are hydrazine-bis-borane, hydrazino-bis-borane and ammonia borane as they have a high hydrogen content, are not shock sensitive and may be prepared from the least expensive borane, diborane, $B_2H_6$. Care must be exercised in the use of hydrazine-higher borane materials as some of them are comparatively shock sensitive. The aforementioned preferred materials are all crystalline solids; other suitable solid materials may be crystalline, granular or plastic.

A variety of compounds are known that thermally decompose to liberate hydrogen and may be used as the endothermic component of this composition of this invention. Suitable compounds include the metal borohydrides, such as, for example, lithium borohydride, $LiBH_4$; sodium borohydride, $NaBH_4$; potassium borohydride, $KBH_4$; the metal triborohydrides, such as, for example, sodium triborohydride, $NaB_3H_8$; and potassium triborohydride, $KB_3H_8$. In cases where volatile organic impurities can be tolerated, solid hydrocarbons may be used, as, for example, polymers such as polyethylene, polypropylene, polystyrene and polybutadiene or appropriate copolymers.

Lithium borohydride is a preferred endothermic component as it has a low decomposition temperature, high ydrogen content and high heat capacity. Other borohydrides and triborohydrides decompose at somewhat higher temperatures than lithium borohydride. Low melting mixtures of alkali metal borohydrides are preferred endothermic components since the use of such mixtures allows a casting procedure to be used in final blended formulation with the exothermic component.

The proportions of exothermic and endothermic components may be widely varied to reduce the temperature of the generated hydrogen. At least enough exothermic component is required to provide sufficient heat on decomposition to heat the mixture to a temperature at which the endothermic component decomposes. Any higher proportion of exothermic material may be used, as it will be recognized that even in mixtures containing only small amounts of endothermic component, thermal energy will be utilized in decomposing it. In preferred compositions the amount of exothermic component is sufficient to provide enough thermal energy to completely decompose the endothermic component, that is, the heat liberated by the exothermic decomposition is equal to the heat required to raise the mixture to the desired temperature plus the heat required to decompose the endothermic component plus the heat required to make up heat losses in the particular generator system used. In such preferred compositions, the maximum hydrogen generation is obtained and a high degree of thermodynamic control of the reaction is obtained. The use of proportions of endothermic material higher or lower than the preferred may be desirable for some purposes. Higher amounts of endothermic material results in greater moderation of the hydrogen decomposition rate and lower hydrogen temperature, but all the available hydrogen from the endothermic component is not liberated. Lower amounts of endothermic materials give complete liberation of available hydrogen but less thermodynamic moderation of the reaction. It is generally desirable to use the highest proportion of exothermic material consistent with the operating characteristics of the generating system in which the composition is used. The heat losses include sensible heat dissipation from the apparatus but for most purposes can be approximated as the amount of thermal energy associated with the released hydrogen; for example, when the generated hydrogen is collected on a pressurized receiver and immediately expanded to inflate a balloon, thermal energy is dissipated as work by the expansion of the gas.

In the form of a granular mixture, the compositions of this invention produce hydrogen at a much slower rate than the extremely rapid decomposition of exothermic materials alone, but even so, the rate of generation is still quite rapid and, for some applications, further moderation of the decomposition is needed. Very moderate hydrogen production rates are obtained when the compositions have a high bulk density, preferably substantially theoretical density. High density compositions may be obtained by compressing mixtures into coherent compacts, suitably at 15,000 to 50,000 p.s.i.g., or by casting in cases where at least one of the components can be melted.

In several reactions, material to be decomposed was placed in a sealed metal cup equipped with a hot wire igniter and an outlet opening into a one liter high pressure cylinder equipped with a pressure gage. When 20 grams of hydrazine-bis-borane was ignited in the system, there was an initial surge of pressure to over 2,500 p.s.i.g., and when the system cooled to room temperature the terminal pressure was 400 p.s.i.g. Using a mixture of 11.5 grams of hydrazine-bis-borane and 8.5 grams of $LiBH_4$, blended by stirring with a spatula in an open beaker, the initial pressure was 750 p.s.i.g., and the terminal pressure was 500 p.s.i.g. In both cases the initial pressure was reached rapidly, in a few seconds, but when using the exothermic-endothermic mixture, the extent of the pressure surge was greatly reduced.

The decomposition rate is substantially reduced by compressing the mixtures into coherent compacts such as pellets. For example, pellets ⅝-inch in diameter and ½-inch thick were made by compressing in a laboratory pellet press at about 15,000 p.s.i.g. about 1 g. of a mixture containing two moles of lithium borohydride for each mole of hydrazine-bis-borane. When these pellets were ignited in a closed system, as by a hot wire, a reaction front slowly spread from the point of ignition through the pellet, as evidenced by a progressive darkening and hydrogen was smoothly and continuously generated without any pressure surge. To illustrate this controlled hydrogen generation, five of the aforesaid pellets were placed in a 12″ length of 1″ I.D. Pyrex pipe closed at the ends by standard flanges. A hot wire igniter was installed in the bottom flange and the top flange was equipped with a ½-inch tubing outlet opening into a Mylar balloon. The pellets were ignited and the balloon gradually inflated; there was no pressure surge and the balloon was not ruptured.

Exothermic components may be slurried in a low melting mixture of molten borohydrides and the mixture is cooled to provide a dispersion of exothermic material in a solidified borohydride matrix. Thus, for example, slow burning cast pellets may suitably be made from hydrazine-bis-borane, hydrazino-bis-borane or ammonia borane and the eutectic composition containing about 46% $KBH_4$ and 54% $LiBH_4$, that melts at about 102° C.

The exothermic and endothermic components of the hydrogen generating components may consist of mixtures of several exothermic compounds or materials, if desired. Also, other materials, such as inert filler or binder, may be used. Exothermic components may include materials that exothermically decompose but do not sustain their own decomposition, such as aminoborane polymers, provided the concentration is low enough to permit the mixture to autogeneously decompose.

According to the provisions of the patent statutes, I have explained the principles and mode of practice of my invention and have described what I now consider to represent its best embodiment. However, I desire to have it understood that, within the scope of the appended claims, the invention may be practiced otherwise than as specifically described.

I claim:
1. A hydrogen generating composition consisting essentially of an intimate mixture of a first solid component selected from the group consisting of hydrazine boranes, lower alkyl substituted hydrazine boranes, ammonia borane, methylamine borane and dimethylamine borane, and a second solid component selected from the group consisting of alkali metal borohydrides and alkali metal triborohydrides, the proportion of first component being at least sufficient to on decomposition heat the composition to the decomposition temperature of the second component.

2. A composition according to claim 1 consisting of a coherent compact of finely divided material.

3. A composition according to claim 2 in which the first component is hydrazino-bis-borane.

4. A composition according to claim 2 in which the first component is ammonia borane.

5. A composition according to claim 2 in which the first component is hydrazine-bis-borane.

6. A composition according to claim 1 in which the second component is an alkali metal borohydride.

7. A composition according to claim 6 in which the second component is lithium borohydride.

8. A composition according to claim 6 in which the second component is a mixture of alkali metal borohydrides.

9. A composition according to claim 8 in which the first component is dispersed in a solid matrix of the second component.

10. A composition according to claim 1 in which the first component yields sufficient heat on decomposition to substantially completely decompose said second component.

11. A composition according to claim 10 in which the first component is hydrazine-bis-borane and the second component is lithium borohydride.

References Cited

UNITED STATES PATENTS 2,942,935   6/1960   King et al. _____ 23—358 X
3,298,799   1/1967   Hough et al. _____ 23—358 X

OTHER REFERENCES

The Condensed Chemical Dictionary, 6th Edition, Reinhold, New York, 1956, p. 1036.

LEON D. ROSDOL, *Primary Examiner.*

I. GLUCK, *Assistant Examiner.*

U.S. Cl. X.R.

23—210, 212; 252—188.3